United States Patent [19]

Eriksson et al.

[11] 4,377,834

[45] Mar. 22, 1983

[54] MULTIPHASE BLOCKING CIRCUITRY FOR ELECTRICAL POWER SUPPLY NETWORKS

[75] Inventors: Leif Eriksson, Sala, Sweden; Salomon Liberman, Ra'anana, Israel

[73] Assignee: Asea Aktiebolag, Vasteras, Sweden

[21] Appl. No.: 44,389

[22] Filed: Jun. 1, 1979

Related U.S. Application Data

[63] Continuation-in-part of Ser. No. 964,201, Nov. 28, 1978, abandoned.

[30] Foreign Application Priority Data

Nov. 28, 1977 [SE] Sweden .............................. 7713410

[51] Int. Cl.³ ............................................. H02H 3/26
[52] U.S. Cl. ...................................... 361/82; 361/68; 324/52
[58] Field of Search ..................... 361/82, 83, 84, 109, 361/110, 111, 59, 65, 79, 67, 68; 324/51, 52

[56] References Cited

U.S. PATENT DOCUMENTS

| | | | |
|---|---|---|---|
| 3,590,324 | 6/1971 | Rockefeller | 361/82 X |
| 3,878,460 | 4/1975 | Nimmersjo | 361/82 X |
| 3,956,671 | 5/1976 | Nimmersjo | 361/65 X |
| 3,986,079 | 10/1976 | Hinman, Jr. | 361/82 |
| 4,053,816 | 10/1977 | Nimmersjo | 361/110 X |
| 4,092,691 | 5/1978 | Williams | 361/110 X |

Primary Examiner—Patrick R. Salce
Attorney, Agent, or Firm—Watson, Cole, Grindle & Watson

[57] ABSTRACT

In circuitry for generating tripping and blocking signals for the protection of electrical power supply network components as a result of the occurrence of faults, the blocking signals are selected from each phase of the electrical power supply network to prevent tripping in each phase for faults occurring behind the protected component. A sequence detector includes a partial detector for each phase of the electrical power supply network and includes logic circuitry responsive to respective tripping and blocking signals generated for each phase of the electrical power supply network in dependence on whether the fault lies ahead or behind the protected electrical component, respectively. Each logic circuit includes a gate and a delay circuit responsive to the output of the gate. The output of the delay circuit in the tripping logic circuit is input to the gate in the blocking logic circuit and vice-versa. Each blocking logic circuit includes an additional gate for receiving a blocking input from another protection circuit which is common to all the partial detectors for passing blocking signals and blocking tripping signals.

4 Claims, 5 Drawing Figures

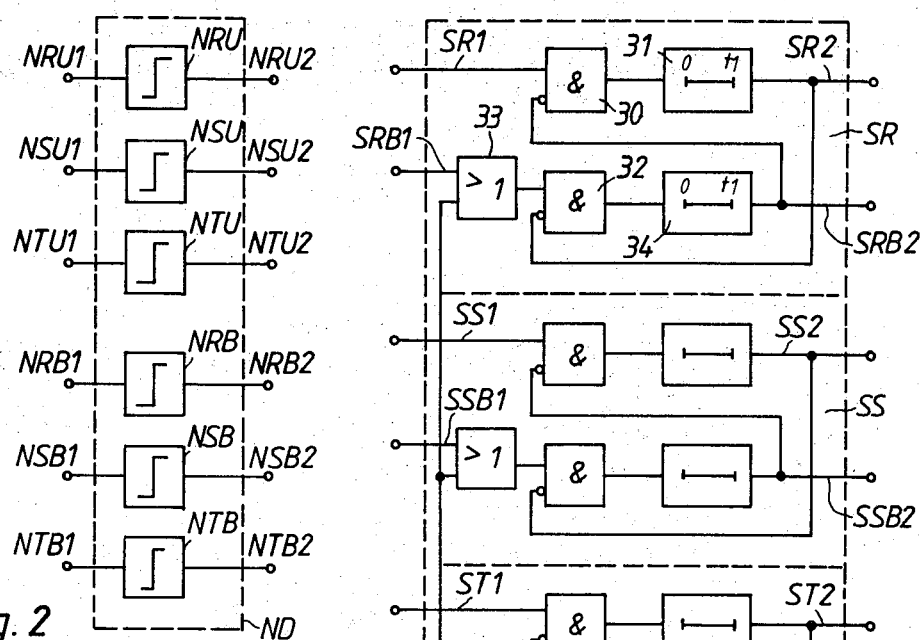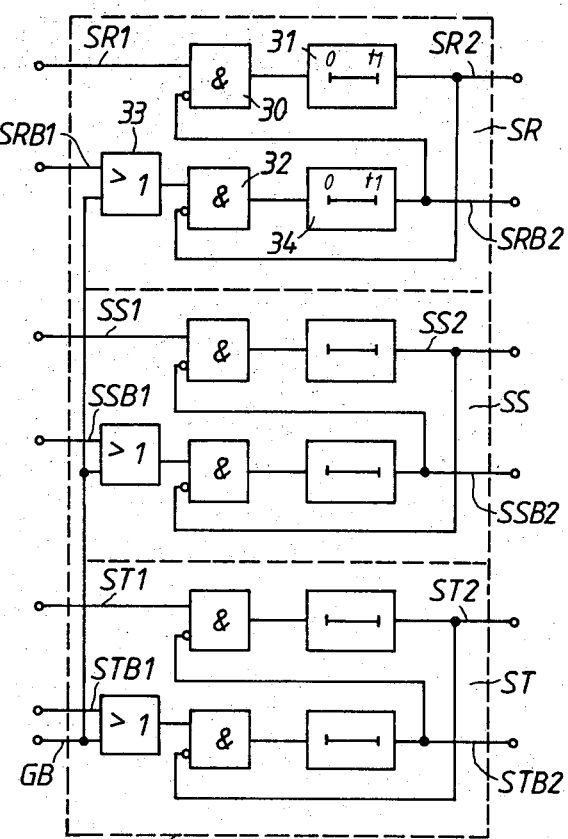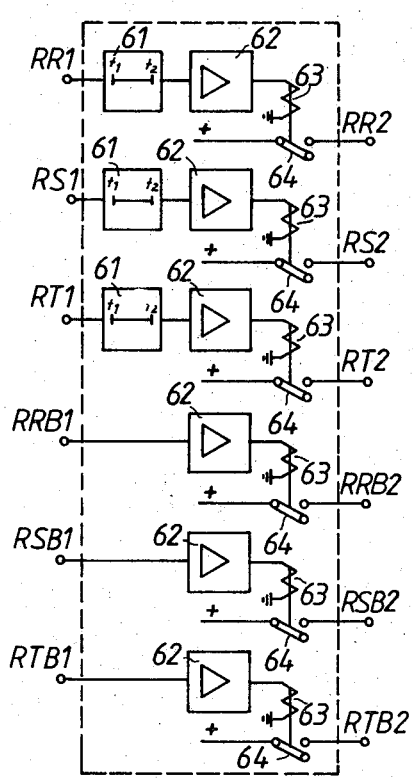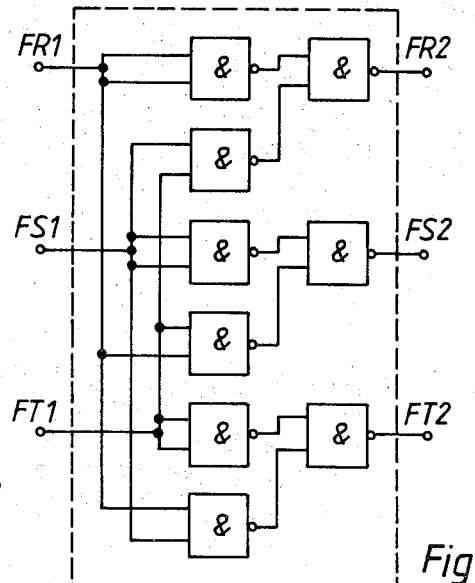
Fig. 2
Fig. 3
Fig. 4
Fig. 5

MULTIPHASE BLOCKING CIRCUITRY FOR ELECTRICAL POWER SUPPLY NETWORKS

This is a Continuation-in-Part application of application Ser. No. 964,201, filed Nov. 28, 1978; now abandoned.

BACKGROUND

1. Field of the Invention

The present invention relates to multiphase protection circuitry for electrical power supply networks, and more particularly to such protection circuitry provided with means for dividing blocking signals in each phase, and for blocking tripping signals in each phase in the event of a fault lying behind the network component to be protected.

2. Prior Art

When a fault occurs in an electrical power supply network, an electrical travelling wave propagates therein and, because of repeated reflections in various discontinuities in the network, such as transformers, stations and the sources of the fault, the currents and voltages contain transients which are disadvantageous for the measuring relays in the relay protection devices. The dominant frequencies in such transients depend on the distance to the fault and the network configuration. Investigations have shown that, even with the introduction of transient suppression filters, it is difficult to use, for example, conventional impedance relays for relay protection devices, the operating time of which is to be less than the time of a cycle. In case of higher system voltages, greater demands are placed on the rapidity of the relay protection devices, while at the same time the damping of the travelling waves decreases. It is therefore more difficult to apply traditional measuring principles to the relay protection devices.

From, for example U.S. Pat. No. 3,956,671, it is known to utilize the direction of movement of the travelling waves at a measuring point for determining the direction to the source of disturbance. By comparing the polarities of the current and voltage waves, for example, it is possible to determine whether the fault lies ahead or behind the measuring point.

In the case of single-phase faults in networks with high system voltages, particularly in radial or thinly meshed networks, it is sometimes desirable for the relay protection devices to release only the faulty phase (so-called single-pole tripping). Since the other two phases are intact, it is easier to maintain stability in the network, at least for some time until high speed reclosing of the originally faulty phase.

In the case of a subsequent fault, that is, for example, a fault that spreads from a fault located behind the protected component and causes a subsequent fault farther on the line, it is desirable to achieve single pole tripping of the protected line or other component. Usually, the subsequent fault occurs in a phase which is different from that in which the original fault occurred, which is due to the increase in voltage in the intact phases with a resultant risk of insulation breakdown and arc flashover. In conventional distance protection devices a large number of measuring relays are required such that subsequent faults are rapidly detected. However, it is difficult to obtain operating times less than 0.5 to 1 cycle. In protection devices measuring the direction of the travelling waves, the protection device is normally completely blocked in the event of an external fault, and thus it becomes insensitive to a real internal fault during the time the protection device is blocked.

SUMMARY OF THE INVENTION

Circuitry generates tripping and blocking signals for the protection of electrical power supply network components as a result of the occurrence of faults. Respective tripping and blocking signals are generated for each phase of the electrical power supply network in dependence on whether the fault lies ahead or behind the electrical component to be protected, respectively, in response to measurement of voltage in current associated with travelling waves generated by faults in each electrical power supply network phase. The blocking signals are selected for each phase of the electrical power supply network to prevent tripping in each phase for faults behind the protected component. The blocking signals are selected by a sequence detector which blocks blocking signals in the presence of a tripping signal and blocks tripping signals in the presence of the blocking signal. The sequence detector includes a partial detector for each phase of the electrical power supply network, and each partial detector includes a blocking logic circuit and a tripping logic circuit each having a gate and a signal delay circuit for expanding the output of the gate. The output of a tripping delay circuit is connected to the input of the gate in the blocking logic circuit and the output of the blocking delay circuit is connected to the input of the gate in the tripping logic circuit. Each blocking logic circuit includes an additional gate for receiving a blocking input from another protection circuit, which is common to all the partial detectors for passing blocking signals and blocking tripping signals.

BRIEF DESCRIPTION OF THE FIGURES

In the accompanying drawing:

FIG. 2 shows a level detector included in the protection circuitry of the invention; and FIGS. 3–5 respectively illustrate a sequence detector, a phase selector, and a relay unit incorporated in the invention.

DETAILED DESCRIPTION

Figure 1:
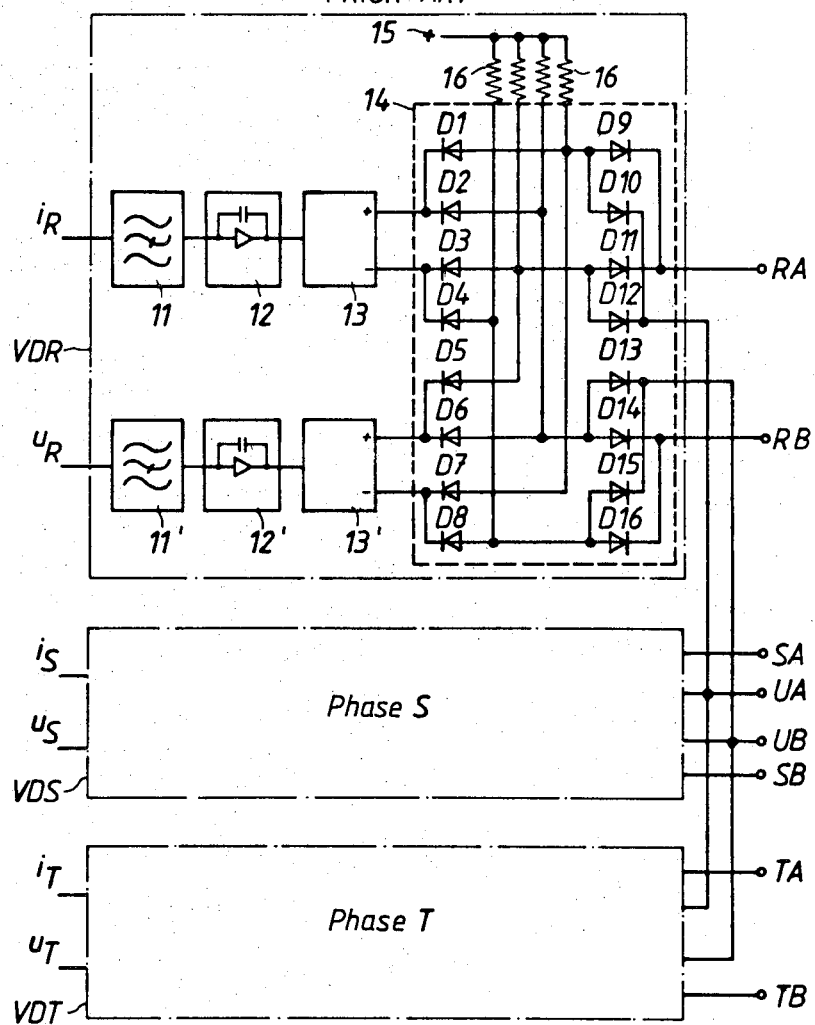
FIG. 1 shows a prior art wave detector included in the inventive protection circuitry.

FIG. 1 shows a three-phase, directional wave detector assembled from three identical single-phase partial detectors VDR, VDS and VDT, one for each phase, and which constitutes a basic component of the protection device. Only partial detector VDR is shown in its entirety in FIG. 1. Each partial detector has an input $i_R$, $i_S$, or $i_T$, respectively representing current measurement signals in the three phases and an input $u_R$, $u_S$, or $u_T$, respectively representing voltage measurement signals. The signals correspond to the three phase currents through the measuring point and three suitably chosen phase voltages, and are normally derived by means of instrument transformers as is known in the art. For each of the current and voltage measurement input signals, each partial detector has band exclusion filters 11, 11' which trap components of the input signal having the same frequency as the power supply network, and the output of which is connected to integrating circuit 12 or 12'. Polarity indicators 13, 13' connected to the output of the respective integrating circuit, each have a + output and a − output and conduct the signal received from the integrator to the + output if it is positive, and to the − output as a positive signal if the received signal is negative.

Each partial detector contains a directional detector 14, which in partial detector VDR is marked by dashed lines. Directional detector 14 is constructed from a number of diodes D1–D16 connected to the + pole of voltage source 15 through resistors 16. Directional detector 14 delivers an output signal on output RA and the output UA, which is common to the whole wave detector, if the signals to the two polarity indicators 13, 13′ have different polarities, whereas an output signal occurs on outputs RB and UB, respectively, if the signals have the same polarity.

The output signal is positive in the embodiment shown in FIG. 1 and its amplitude corresponds to the amplitude of the smallest of the input signals to polarity indicators 13, 13′. The largest of the signals occurring at RA, SA, TA and RB, SB, TB, respectively, is emitted to the outputs UA and UB, which are common to all three partial detectors, because of the operation of diodes D9–D16 at the output side of directional detectors 14.

In each connection to an electrical component, the positive current direction is defined as the direction towards the component in question. If a travelling wave moves in the negative direction, the wave detector emits tripping signals on tripping outputs RA, SA, TA and on UA; and if the travelling wave moves in the positive direction, blocking signals are obtained on blocking outputs RB, SB, TB and on UB. If a certain wave detector is used for protection of a second adjacent component, the blocking signal has a tripping effect, and the tripping signal a blocking effect for the second component.

The output signals from the wave detector are supplied to level detector ND shown in FIG. 2. Level detector ND has three level-sensing partial detectors NRU, NSU, NTU for providing respective trippings signals for each phase. The inputs NRU1, NSU1, NTU1 are each respectively connected to a corresponding tripping output RA, SA, TA of the wave detector in FIG. 1. Each of level-sensing partial detectors NRU, NSU, NTU has one output NRU2, NSU2, NTU2, respectively. The level detector also includes three level-sensing partial detectors NRB, NSB, NTB for respectively generating blocking signals from respective inputs NRB1, NSB1, NTB1, each of which is connected to a corresponding blocking output RB, SB, TB of the wave detector of FIG. 1. Level-sensing partial detectors NRB, NSB, NTB each provide a respective output NRB2, NSB2, NTB2 as shown in FIG. 2.

In case of double ground faults, it is possible according to the invention to block the protection circuitry against tripping of the faulty phase only when a first fault, lying behind the protected component, occurs and for which the protection circuit should therefore not trip. It is then possible to manage a single pole tripping upon a second fault, lying ahead of the protected component, if such a fault occurs in a phase different from that in which the first fault occurs, which is most likely. An exemplary means for carrying out the above operation is shown in FIG. 3, which is a sequence detector indicating if the first travelling wave is in a tripping direction, caused by a fault lying ahead of the protected component, or in a blocking direction, caused by a fault lying behind the protected component. That is, when a signal has satisfactorily fulfilled an amplitude criterion in the level detector according to FIG. 2, signals of the opposite polarity are prevented from being forwarded in the same phase. Thus, in the case of a single-phase fault lying behind the protected component, the tripping signal is blocked only in the faulty phase. In the case of a subsequent fault in another phase, however, the tripping signal in that phase is not blocked but is allowed to pass.

FIG. 3 shows a schematic of sequence detector SD included in the logic system. It comprises three identical partial detectors SR, SS, ST, one for each phase. Since the three partial detectors are identical, only partial detector SR of the R-phase is described in detail. Partial detector SR includes first AND gate 30, one input of which is connected to input SR1, which in the logic system is connected to the output NRU2 of the level-sensing partial detector NRU. The output of AND gate 30 is connected through delay circuit 31 to output SR2 of partial detector SR. An input of second AND gate 32 is connected to the output of OR gate 33, one input of which is connected to input SRB1 of partial detector SR. Input SRB1 is a blocking input and connected in the logic system to blocking output NRB2 of the level-sensing partial detector NRB. The second input of OR gate 32 is connected to blocking input GB common to the entire sequence detector SD. Blocking input GB is a blocking signal, for example from a protection device in an adjacent component when the last-mentioned protection device has tripped. The second input of AND gate 32, which is inverted, is connected to output SR2 and its output is connected, via second time delay circuit 34, to the blocking output SRB2 as well as to the second inverted input of first AND gate 30.

When no signal is present, a "one" is applied on the lower, inverted input of each of gates 30 and 32. If a tripping signal arrives at the upper input of gate 30, a "one" appears on its output and a tripping signal appears on output SR2 for at least the time interval $t_1$. The lower input of AND gate 32 is "zero", whereby a possible blocking signal on input SRB1 cannot pass AND gate 32 and occur as a blocking signal on output SRB2.

For single pole tripping of circuit-breakers in the case of a single-phase ground fault, the protection logic system includes phase selector F (an exemplary embodiment thereof is shown in FIG. 4) constructed of logic elements. Phase selector F generates a "one" on all outputs FR2, FS2 and FT2 if at least two of inputs FR1, FS1 and FT1 are a "one". If, however, as is the case with a single phase fault, only one of the inputs is a "one", only the corresponding output will provide a "one". Inputs FR1, FS1, FT1 are respectively connected to partial detector outputs SR2, SS2, ST2. The operation of phase selector F is apparent from its logic structure and therefore a detailed explanation is not necessary for the purpose of using the invention.

The outputs FR2, FS2, FT2 of the phase selector are each connected to an input RR1, RS1, RT1 of relay unit R, as shown in FIG. 5, which contains a time delay circuit 61 and an amplifier 62 for each phase. The timing circuit extends an incoming tripping pulse so that it lasts for the time interval $t_2$ provided that the tripping pulse has lasted for at least time $t_1$. Amplifier 62 provides current to winding 63 in a relay with a make contact 64. For the operation of the relay, a tripping current is fed into outputs RR2, RS2, RT2. The relay unit also has three inputs RRB1, RSB1, RTB1 for blocking signals, and these inputs are connected to corresponding blocking outputs SRB2, SSB2, STB2 of the sequence detector. The blocking signals occur on outputs RRB2, RSB2, RTB2.

Time delay circuit 61 is necessary at least in those cases where the protected component is a section of the line, because then it is necessary to wait for a possible blocking signal from the other end of the line. The delay $t_1$ must be so long that a blocking signal from the other end of the line arrives safely before a tripping signal is emitted. The delay should be capable of being varied for adjustment to the delay of the communication channel that transmits the signals between the two ends of the line section. Time $t_2$, which extends the tripping pulse, is necessary only in those cases where the duration of the tripping pulse is shorter than the time of operation of the tripping relay.

Through the introduction of a conventional undervoltage detector having three inputs per phase which are each connected to one of the outputs of the phase selector, and having an additional three inputs connected to the voltage inputs of the wave detector, and three outputs connected to the tripping inputs RR1, RS1, RT1 of the relay unit, it is possible to achieve triple-pole tripping when an undervoltage interval occurs in one of the phases because of a single pole tripping and a new single phase fault occurs in any of the remaining phases after the first-mentioned phase has been disconnected but before it has been high speed reclosed. This criterion indicates that the first fault has caused a subsequent fault in another phase, or that two consecutive single phase faults have occurred. In such a case, a double pole tripping must be prevented. Such a multiphase undervoltage protection circuit is described in a co-pending application Ser. No. 964,202 of the same inventors filed on Nov. 28, 1978 and abandoned in favor of a Continuation-in-Part application Ser. No. 44,388, filed on June 1, 1979.

What is claimed is:

1. Circuitry for generating tripping and blocking signals for the protection of electrical components included in a three-phase electrical power supply network as a result of the occurrence of faults therein, comprising:

separate direction determining means for each of the phases of the network, each of said direction determining means including means for determining, in response to measurement of the voltage and current associated with travelling waves generated by a fault at a single measuring point of the affected phase, whether the fault lies ahead of or behind the measuring point, and for generating a tripping signal upon occurrence of a fault which lies ahead of the measuring point and a blocking signal upon occurrence of a fault which lies behind the measuring point;

said direction determining means being supplied with measured values of voltage and current of said phase at said measuring point, and further including filtering means for suppressing network frequency components in said measured values;

polarity sensing means responsive to the output of said filtering means for generating said tripping and blocking signals in dependence on the polarity of the output of the filtering means;

separate sequence detecting means for each of the phases of the network, each of said sequence detecting means being associated with one of said phases and connected to the direction determining means associated with the same phase for receiving the tripping and blocking signals therefrom and blocking any incoming tripping signals in response to a blocking signal to prevent tripping in said one phase for faults occurring behind the measuring point.

2. Circuitry according to claim 1, wherein each of said sequence detecting means further includes means to block any blocking signals in response to a tripping signal.

3. Circuitry according to claim 2 wherein each of said sequence detecting means includes a blocking logic circuit and a tripping logic circuit each including gating means respectively responsive to a blocking signal and a tripping signal from an associated direction determining means, and a signal delay circuit for expanding the output of said gating means to provide respective expanded blocking and tripping signals, the expanded blocking and tripping signals being respectively applied to the gating means of said tripping logic circuit and said blocking logic circuit, each said blocking logic circuit further including additional gating means for receiving a blocking input from another protection circuit and being common to all said sequence detecting means for passing blocking signals and blocking tripping signals.

4. Circuitry according to claim 3 wherein each said gating means includes an AND gate and said additional gating means is an OR gate having input for receiving a blocking signal from an associated direction determining means.

* * * * *